United States Patent
Lindberg Nilsson et al.

(10) Patent No.: US 12,131,554 B2
(45) Date of Patent: Oct. 29, 2024

(54) VEHICLE OBJECT DETECTION

(71) Applicant: Ningbo Geely Automobile Research & Development Co., Ltd., Ningbo (CN)

(72) Inventors: Erik Lindberg Nilsson, Gothenburg (SE); Jonathan Johansson, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 387 days.

(21) Appl. No.: 17/728,376

(22) Filed: Apr. 25, 2022

(65) Prior Publication Data

US 2022/0245951 A1 Aug. 4, 2022

Related U.S. Application Data

(63) Continuation of application No. PCT/CN2020/124145, filed on Oct. 27, 2020.

(30) Foreign Application Priority Data

Nov. 6, 2019 (EP) .................................. 19207494

(51) Int. Cl.
*G06V 20/58* (2022.01)
*G06T 7/70* (2017.01)
(Continued)

(52) U.S. Cl.
CPC .............. *G06V 20/58* (2022.01); *G06T 7/70* (2017.01); *G06V 10/764* (2022.01);
(Continued)

(58) Field of Classification Search
CPC .. G06V 20/58; G06V 10/764; G06V 10/7747; G06V 10/776; G06V 10/811;
(Continued)

(56) References Cited

U.S. PATENT DOCUMENTS 9,122,932 B2 9/2015 Bala
9,158,971 B2 10/2015 Gaidon
(Continued)

FOREIGN PATENT DOCUMENTS

CN 109479118 A 3/2019
EP 3466762 A1 4/2019
(Continued)

OTHER PUBLICATIONS

International Search Report from corresponding International Application No. PCT/CN2020/124145, mailed on Jan. 27, 2021, 2 pages.
(Continued)

*Primary Examiner* — Samir A Ahmed
(74) *Attorney, Agent, or Firm* — Tucker Ellis LLP (57) ABSTRACT

An object detection method includes obtaining a first video stream having video images with object detection data of an area, identifying an object in the area by identifying one or more first object detection data of the object in the first video stream corresponding to validated object detection data, determining a position of the object in the area, obtaining a second video stream having video images with object detection data of the area, identifying second object detection data of the second video stream at the position of the object and determining whether the second object detection data is un-validated object detection data, and updating the validated object detection data of the object detection system if it is determined that the second object detection data of the object is un-validated object detection data.

19 Claims, 2 Drawing Sheets

(51) Int. Cl.
  *G06V 10/764* (2022.01)
  *G06V 10/774* (2022.01)
  *G06V 10/776* (2022.01)
  *G06V 10/80* (2022.01)
  *G06V 20/40* (2022.01)
  *H04N 5/77* (2006.01)

(52) U.S. Cl.
  CPC ........ *G06V 10/7747* (2022.01); *G06V 10/776* (2022.01); *G06V 10/811* (2022.01); *G06V 20/41* (2022.01); *H04N 5/77* (2013.01); *G06T 2207/10016* (2013.01); *G06T 2207/20081* (2013.01); *G06T 2207/30261* (2013.01)

(58) Field of Classification Search
  CPC ........ G06V 20/41; G06V 10/774; G06T 7/70; G06T 2207/10016; G06T 2207/20081; G06T 2207/30261; H04N 5/77; G06F 18/256
  See application file for complete search history.

(56) References Cited

U.S. PATENT DOCUMENTS

| | | |
|---|---|---|
| 9,317,780 B2 | 4/2016 | Bala |
| 2014/0072173 A1 | 3/2014 | Haas |
| 2015/0286865 A1 | 10/2015 | McCoy |
| 2018/0373943 A1 | 12/2018 | Tanigawa |
| 2019/0073545 A1 | 3/2019 | Dolgov |
| 2019/0164049 A1 | 5/2019 | Bai |
| 2019/0294966 A1* | 9/2019 | Khan ...................... H04W 4/40 |

FOREIGN PATENT DOCUMENTS

| | | |
|---|---|---|
| EP | 3547215 A1 | 10/2019 |
| JP | 2010079639 A | 4/2010 |

OTHER PUBLICATIONS

Alaa Awad Abdellatif, et al., "Active Learning-based Classification in Automated Connected Vehicles," arXiv:2002.07593v1, Feb. 18, 2020, 6 pages.

* cited by examiner

VEHICLE OBJECT DETECTION

RELATED APPLICATION DATA

This application is a continuation of International Patent Application No. PCT/CN2020/124145, filed Oct. 27, 2020, which claims the benefit of European Patent Application No. 19207494.6, filed Nov. 6, 2019, the disclosures of which are incorporated herein by reference in their entireties.

TECHNICAL FIELD

The present disclosure relates to the field of detection systems for vehicles. More particularly, it relates to a method, a computer program and a system for object detection training.

BACKGROUND

Object detections performed by vehicles, such as pedestrian detection, vehicle detection, animal detection, obstacle detection etc. are typically based on some kind of algorithm that has been tuned by means of real word data in order to give an as good detection performance as possible.

Typically, these algorithms involve manual analyzation and labelling of the real word data, and tuning the algorithms may hence become cumbersome and high in costs.

U.S. Pat. No. 9,158,971 B2 describes a system and method for enabling generation of a specific object detector for a category of interest. The method includes identifying seed objects in frames of a video sequence with a pre-trained generic detector for the category. An appearance model is iteratively learned for each of the seed objects using other frames in which the seed object is identified.

However, in scenarios where a video stream has inferior quality, or the line of sight is partially blocked it may become difficult for the algorithm to determine that an object comprised in the video stream is actually an object that is to be detected.

There is thus a need for improved methods and systems for object detection by a vehicle.

SUMMARY

An object of the present disclosure is to provide a method, a system and a computer program product where the previously mentioned problems are avoided or at least mitigated. This object is at least partly achieved by the features of the independent claims.

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement or system is referred to herein, it is to be understood as a physical product; e.g., an apparatus. The physical product may comprise one or more parts, such as controlling circuitry in the form of one or more controllers, one or more processors, or the like.

A first aspect is a method for training an object detection system for a vehicle. The object detection system comprises validated object detection data (VODD) of one or more objects. The method comprises the steps of:

obtaining a first video stream comprising video images with object detection data of an area, identifying an object in the area by identifying one or more first object detection data of the object in the first video stream corresponding to validated object detection data, determining a position of the object in the area, obtaining a second video stream comprising video images with object detection data of the area, identifying second object detection data of the second video stream at the position of the object and determining whether the second object detection data is un-validated object detection data, updating the validated object detection data of the object detection system if it is determined that the second object detection data of the object is un-validated object detection data, thereby training the object detection system to recognize patterns in un-validated object detection data.

An advantage with the above aspect is that training of e.g. a detection algorithm of an object detection system for a vehicle becomes more reliable in terms of detecting objects since video streams from different vehicles featuring the same area are used for object detection training. Hence, if one vehicle has confirmed that it has detected e.g. a pedestrian, then the video streams of other vehicles covering the same area, but which may not be able to verify the object, may be used to update the object detection system in order to train the system to better recognize/detect objects.

Another advantage with the above embodiment is that object data which is gathered from the vehicles and which covers the same area and position in which an object has been validated, i.e. if object data that is validated object detection data from one vehicle clearly able to identify the object at the same area and position exists, but which data from another vehicle does not unambiguously show the object, i.e. un-validated object detection data, may preferably be used for updating the object detection system. By using object detection data that comprise un-validated object detection data (i.e. it is not confirmed that the data actually portray the object), the system may be trained to recognize the object even if the image data is not complete, or the line of sight is obstructed. This is based on that the system knows that a confirmed object is at that position based on the first video stream comprising video images with validated object detection data. Thus, by updating the validated object detection data of the object detection system if it is determined that the second object detection data is un-validated object detection data, a better training algorithm can be developed compared to if only validated images of the object were used for training since the system may be trained to recognize patterns in un-validated data.

In some embodiments, the step of obtaining the first video stream comprising video images with object detection data of the area comprises receiving the first video stream from a first vehicle.

An advantage with the above embodiments is that live data for an area may be gathered easily.

In some embodiments, the step of obtaining the second video stream comprising video images with object detection data of the area comprises receiving the second video stream from a second vehicle.

An advantage with the above embodiment is that data for an area may be gathered easily. By gathering data from a second vehicle over the same area, the object detection system may receive diverse data over the same area, which may be used for updating the system. The diverse data provides better training and higher granularity compared to if data was only received from one vehicle.

In some embodiments, the method may further comprise storing, at the second vehicle, the second video stream comprising video images with un-validated object detection data.

An advantage with the above embodiment is that data storage may be reduced since not all video streams have to be stored, but rather video streams that may be used as learning material (i.e. comprising video images with un-validated object detection data) may be stored locally and used at a later point in time.

In some embodiments, the method may further comprise determining a time stamp of the first and second video streams and a vehicle location, wherein the time stamp indicating when the respective video stream was obtained, and wherein the vehicle location indicates a geographical position where the first and second video streams were obtained.

An advantage with the above embodiment is that only video streams that have been obtained/recorded at a valid point in time may be taken into consideration. I.e. vehicles that have video streams covering the area of the object, but which were recorded at a different point of time than a video stream having identified valid object detection data may in some embodiments not be taken into consideration.

Another advantage with the above embodiments is that the geographical location and/or orientation of the vehicle recording the video stream is determined and taken into account in order to easier determine the position of the object and in some embodiments to further determine which video streams should be taken into account for training the system.

In some embodiments, determining whether the second object detection data is un-validated object detection data comprises correlating the second object detection data to validated object detection data and based on the correlation determining a confidence value of the second object detection data, wherein if the confidence value is determined to be below a confidence threshold, the second object detection data is determined to be un-validated object detection data.

An advantage with the above embodiments is that determining a correlation, e.g. a confidence value, between validated object detection data from the system or the first video stream and object detection data of the second video stream enables quick determination of whether the object detection data of the second video stream is valid or un-valid object detection data.

In some embodiments, the validated object detection data that the second object detection data is correlated against is the validated object detection data of the first video stream.

An advantage of the above embodiment is that correlation is made between validated data covering the same area, and hence probably the same object is to be verified. The update of the object detection system may thus be made based on the content of the first and the second video streams.

It should be noted that the phrase "update the object detection system" may mean update/train a detection algorithm of the object detection system so that it through self-learning can improve object detection.

In some embodiments, the step of determining the position of the object comprises determining a distance and an angle to the object in relation to the first vehicle configured to obtain the first video stream comprising video images with object detection data of the area.

An advantage with the above embodiment is that a position of the detected object may be easily determined.

In some embodiments, the step of identifying the object in the area further comprises identifying an object type of the object to be one or more of a person, a vehicle, fixed object, moving object or an animal.

An advantage with the above embodiments is that several different types of objects may be detected, such as persons being pedestrians or bicycle riders, Segway riders, kick bike riders, children, people in electric wheel chairs or vehicles such as trucks, other cars, trailers, motor bikes, and agricultural vehicles such as tractors and combines; fixed objects such as houses, rocks, trees, walls and signs; moving objects such as strollers, prams, wheel chairs, skate boards, shopping carts and lorries; or animals such as dogs, cats, horses, reindeers, wild hogs and rabbits. Of course, these are just examples, other types of persons, vehicles, fixed object, moving objects or animals are possible to be detected by means of the embodiments disclosed herein.

In some embodiments, object type may relate to free space, such as background. I.e. when there is no object/object type to detect.

An advantage with detection free space is that the object detection system may train itself to determine when there actually is an object to detect, and when there is no object to detect.

In some embodiments, the step of obtaining the second video stream comprising video images with object detection data of the area comprises identifying vehicles recording respective video streams comprising video images with object detection data of the area and requesting to receive the respective video streams.

An advantage of the above embodiment is that a larger amount of video data covering the area may be gathered. Hence, data covering different angles and distances of the same location may be used to train and update the object detection system leading to high granularity and a more reliable object detection.

In some embodiments, the second video stream comprising video images with object detection data of the area comprises un-validated object detection data at the position of the object.

An advantage of the above embodiment is that video streams from other vehicles covering the desired location and area are preferably requested if they comprises detection data that is un-validated, i.e. it is not validated if the captured data actually comprise the validated object. By using un-validated object data, the training algorithm of the object detection system may be improved. The un-validated object data may be correlated to the validated object data comprised in e.g. the first video stream, and it may hence be determined that the un-validated data is in fact validated data which may be used for training the system. The correlation may e.g. be made through pattern recognition or by determining a confidence value denoting a match between the data or a probability that the data comprise the same object.

A second aspect is an object detection system comprises a control unit and validated object detection data of one or more objects. The control unit is configured to perform the steps of:

obtaining a first video stream comprising video images with object detection data of an area,     identifying an object in the area by identifying one or more first object detection data of the object in the first video stream corresponding to validated object detection data,     determining a position of the object in the area,     obtaining a second video stream comprising video images with object detection data of the area, identifying second object detection data of the second video stream at the position of the object and determining whether the second object detection data is un-validated object detection data, updating the validated object detection data of the object detection system if it is determined that the second object detection data of the object is un-validated object detection data, thereby training the object detection system to recognize patterns in un-validated object detection data.

An advantage with the above aspect is that training of an object detection system for a vehicle becomes more reliable in terms of detecting objects since video streams from different vehicles featuring the same area are used for object detection. Hence, if one vehicle has confirmed that it has recorded e.g. a pedestrian, then the video streams of other vehicles recording the same area may be used to update the object detection system in order to provide further and different video images of the detected object.

Another advantage with the above embodiments is that by identifying and using object detection data that comprise un-validated object detection data (i.e. it is not confirmed that the data actually portray the object), the system may be trained to recognize the object even if the video image data is not complete, or the line of sight is obstructed, since the system will know that it is confirmed that an object is at that location. Hence, a better training algorithm can be developed compared to if only confirmed images of the object were used for training.

In some embodiments, the object detection system is comprised in a vehicle.

In some embodiments, the object detection system is comprised in a remote server.

In some embodiments, the object detection system comprises a system with several units. The units may e.g. be comprised in vehicles and servers. In some embodiments, the system may be comprised only in vehicles.

In some embodiments, the control unit is configured to be connected to and receive video streams comprising video images with object detection data from at least a first and a second vehicle.

An advantage with the above embodiments is that data for an area may be gathered easily. By gathering data from more than one vehicle over the same area, the object detection system may receive diverse data covering the same area, which may be used for updating the system. The diverse data provides better training and higher granularity compared to if data was only received from one vehicle.

In some embodiments, the control unit is configured to store, at the second vehicle, the second video stream comprising video images with un-validated object detection data.

An advantage with the above embodiment is that data storage may be reduced since not all video streams have to be stored, but rather video streams that may be used as learning material (i.e. comprising un-validated object detection data) may be stored locally and used at a later point in time.

In some embodiments, the control unit is configured to determine a time stamp of the first and second video streams and a vehicle location, wherein the time stamp indicates when the respective video stream was obtained and wherein the vehicle location indicates a geographical location where the first and second video streams were obtained.

An advantage with the above embodiment is that only video streams that have been obtained/recorded at a valid point in time may be taken into consideration. I.e. vehicles that have video streams covering the area of the object, but which were recorded at a different point of time than a video stream having identified valid object detection data may not be taken into consideration.

Another advantage with the above embodiments is that the geographical location and/or orientation of the vehicle recording the video stream is determined and taken into account in order to easier determine the position of the object and in some embodiments to determine which video streams should be taken into account for training the system.

In some embodiments, the control unit is configured to determining whether the second object detection data is un-validated object detection data by correlating the second object detection data to validated object detection data and based on the correlation determining a confidence value of the second object detection data, wherein if the confidence value is determined to be below a confidence threshold, the second object detection data is determined to be un-validated object detection data.

An advantage with the above embodiments is that determining a correlation, e.g. a confidence value, between validated object detection data and object detection data of the video stream quick determination of whether the object detection data of the video stream is valid or un-valid object detection data may be done.

In some embodiments, the control unit is configured to identifying second object detection data comprising un-validated object detection data of the second video stream at the position of the object.

In some embodiments, the step of identifying the object in the area further comprises identifying an object type of the object to be one or more of a person, a vehicle, fixed object, moving object or an animal.

An advantage with the above embodiments is that several different types of objects may be detected, such as persons being pedestrians or bicycle riders, Segway riders, kick bike riders, children, people in drive motors; or vehicles such as trucks, other cars, trailers, motor bikes, and agricultural vehicles such as tractors and combines; fixed objects such as houses, rocks, trees, walls and signs; moving objects such as strollers, prams, wheel chairs, skate boards, shopping carts and lorries; or animals such as dogs, cats, horses, reindeers, wild hogs and rabbits. Of course, these are just examples, other types of persons, vehicles, fixed object, moving object or animals are possible to be detected by means of the embodiments disclosed herein.

In some embodiments, the control unit is configured to identifying vehicles recording respective video streams comprising video images with object detection data of the area and request to receive the respective video streams.

An advantage with the above embodiments is that a larger amount of video data covering the area may be gathered. Hence, data covering different angles and distances of the same location may be used to train and update the object detection system leading to high granularity and a more reliable object detection.

In some embodiments, the requested video streams comprises video images with object detection data of the area, the object detection data comprising un-validated object detection data associated with the position of the object.

An advantage with the above embodiment is that object data which is associated with the position of the object (i.e. the video stream has covered the position), but which has not been validated to comprise validated object data (i.e. an object which should be detected such as a pedestrian) may be validated to comprise the object based on object data obtained from another video stream where the object has been validated. Hence, the training algorithm is given better granularity and more reliable object detection.

A third aspect is a computer program comprising instructions, which, when the program is executed by a computer, cause the computer to carry out the method according to the first aspect.

In some embodiments, any of the above aspects may additionally have features identical with or corresponding to any of the various features as explained above for any of the other aspects.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
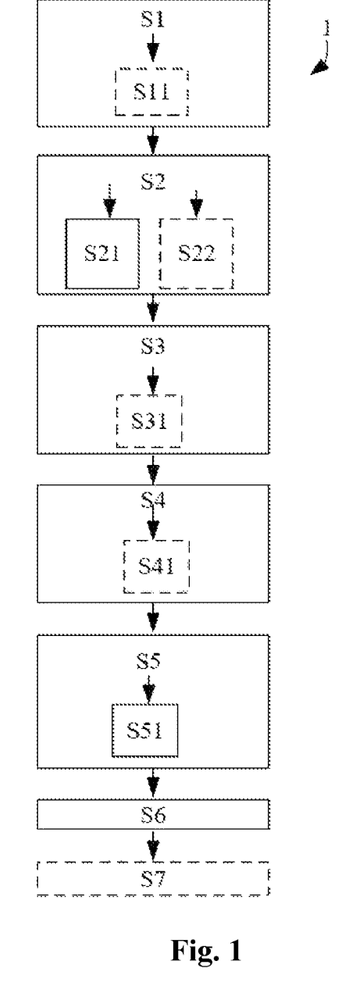
FIG. 1 shows a flow chart illustrating method steps according to some embodiments.

FIG. 1 illustrates an example method 1 according to some embodiments. The method 1 is for training an object detection system 10 for a vehicle 100, 31, 32, 33, 34. The object detection system 10 comprises validated object detection data VODD of one or more objects, i.e. object data where it is confirmed that the object data portrays the one or more desired object to be detected.

The method 1 starts in step S1 with obtaining a first video stream VS1 comprising video images with object detection data ODD of an area 21. Object detection data is made up of video images of the video stream VS1 capturing the immediate surroundings of a vehicle. Immediate surroundings may e.g. be a 5, 10, 50, 100, 400, 600 or more meter radius extending from the car. In step S2 the method continues with identifying S21 an object 22 in the area 21 in the immediate surroundings of the vehicle by identifying one or more first object detection data ODD1 of the object in the first video stream VS1 corresponding to validated object detection data VODD.

Validated object detection data may e.g. be stored in the object detection system and comprise a database of validated objects. Validated objection data may e.g. correspond to a multitude of images portraying varying objects in varying settings, which helps the object detection system to learn and recognize (i.e. be trained for detection) and hence detect objects captured in the video stream.

Alternatively or additionally, in some embodiments, validated object detection data is a detection algorithm analyzing (e.g. by applying pattern recognition) the content of the object detection data of the video stream in order to determine whether the content comprise e.g. pixels forming an object that should be detected.

In order to determine whether the object detection data of the first video stream is validated object detection data, the obtained first object detection data may be correlated against the validated object detection data of the object detection system. The correlation may e.g. comprise comparing the video image content of the first video stream to or with the valid object detection data and determine a correlation result or confidence value for indicating a probability that the first object detection data is valid object detection data. If the correlation value or confidence result indicates that there is e.g. a higher than 60% probability that the first object detection data comprise an video image of e.g. a person, the first object detection data may be labeled, or determined as valid object detection data. It should be noted that 60% is just an example, and values ranging both higher and lower are contemplated.

The method 1 then continues in step S3 with determining a position 23 of the object 22 in the area 21. In some embodiments, determining a position 23 of the object 22 may also comprise tagging the position 23 with a time stamp, i.e. determining a time stamp of the video stream. The time stamp may enable the object detection system 10 to collect data collected within a predetermined time range. For example, for moving objects such as pedestrians, cyclers, vehicles etc. there may be little point in collecting video streams over the same area that are captured hours or days later. However, in some scenarios where objects have been detected to be at a validated location for longer periods of time (e.g. if the object is fixed, or if a pattern of movement has been detected such as a commuter being detected at the same area approximately the same time every day) it may be beneficial to collect video streams covering the area for longer periods of time as well.

In some embodiments, determining the position 23 of the object 22 may alternatively or additionally comprise determining a vehicle location and/or vehicle orientation of the vehicle recording the respective video stream. By associating the video stream with the vehicle location and orientation more information may be taken into account when determining the location of the object, which may also assist other vehicles in the area to pin point the location of the object. The location of the vehicle may also be of importance when determining whether or not a video stream should be gathered for object detection system training.

In step S4, the method 1 comprises obtaining a second video stream VS2 comprising video images with object detection data ODD of the area 21. As described above, object detection data is made up of video images capturing the immediate surroundings of the vehicle.

Hence at least two video streams covering the same area are obtained.

In some embodiments, a time stamp is determined for both the first and the second video stream.

Then, in step S5 the method comprises identifying second object detection data ODD2 of the second video stream VS2 at the position 23 of the object 22 and determining whether the second object detection data ODD2 is un-validated object detection data UODD. Hence, the method 1 may comprise that the second video stream is analyzed such that video images comprising the position of the object is taken into account.

In some embodiments, the step S51 of determining whether the second object detection data ODD2 is un-validated object detection data UODD may comprise correlating the second object detection data ODD2 to validated object detection data VODD and based on the correlation determining a confidence value of the second object detection data ODD2. If the confidence value is determined to be below a confidence threshold, the second object detection data ODD2 is determined to be un-validated object detection data UODD.

Hence, the method 1 may comprise identifying or determining that at least one vehicle 100, 31, 32, 33, 34 (e.g. the second vehicle) is not being able to verify that what is seen in the object detection data ODD of the second video stream VS2, at the position 23 of the object 22, is actually the object 22. Thus, the second video stream VS2 comprise un-validated object detection data UODD associated with the position 23 of the object 22.

In some embodiments, the second object detection data ODD2 may be correlated against the validated object detection data VODD of the first video stream VS1.

Hence, the validated object detection data VODD of the first stream VS1 may be used in order to determine whether the second object detection data ODD2 is valid or un-valid object detection data. If the second object detection data ODD2 is determined to be un-valid object detection data UODD based on the correlation with the first video stream VS1, the object detection system 10 may use the un-valid object detection data UODD of the second stream VS2 in order to train itself to find a pattern and better recognize objects. This may be enabled since the first video stream VS1 comprise validated object detection data VODD over an object 22 at a determined position. The second video stream VS2 covering the same area 21 and position 23 should hence also see and be able to verify the object 22. However, the second video stream VS2 may for some reason comprise inferior quality or be partially obstructed and only parts of the object are discernible, but not enough to perform a correlation or pattern detection that results in valid object detection. In such case, the second video stream VS2 still possibly show the object 22, but the algorithm of the object detection system 10 is not able to verify it. Thus, the object detection system 10 may use the un-validated object detection data UODD for training itself to recognize objects based on the fact that the first video stream VS1 comprises validated object detection data VODD of the object 22, and the second video stream VS2 should possibly hence as well.

In some embodiments, un-validated data may be determined as un-validated data simply because the object may have moved rapidly out of the way, or walked behind a tree or is obscured by a passing vehicle, etc. and a second vehicle is simply not seeing it. In such scenarios, the un-validated data may still be used for training the system. It may e.g. be beneficial for the algorithm to learn how do recognize background data (free space), i.e. scenes where there is no object to detect. Hence, the object detection system may train itself to recognize both objects and non-objects based on un-validated object detection data (which data may comprise both un-validated objects and non-existing objects.

When at least two video streams have been captured and the object detection data associated with each respective video stream has been analyzed/identified, the method continues in step S6 with updating the validated object detection data VODD of the object detection system 10 if it is determined that the second object detection data ODD2 of the object 22 is un-validated object detection data UODD. In some embodiments, the method may also comprise updating the validated object detection data VODD with the un-validated object detection data UODD based on the validated object detection data VODD of the first video stream VS1.

In some embodiments, the step S1 of the method 1 comprising obtaining the first video stream VS1 comprising video images with object detection data ODD of the area may optionally further comprise receiving in step S11 the first video stream VS1 from a first vehicle.

The object detection system 10 may be located in one or more vehicles 100, 31, 32, 33, 34 but may also communicate wirelessly with and/or comprise a server 200 in e.g. a network cloud. The server 200 may e.g. collect video streams from the first vehicle 100, 31 as well as from other vehicles 100, 31, 32, 33, 34 and perform the training of the object detection system 10 based on the received video streams and the object detection data ODD comprised therein. The server 200 may then update the validated object detection data VODD (e.g. an object detection algorithm) and push this update through the network cloud to the object detection system 10 of each respective vehicle 100, 31, 32, 33, 34.

In some embodiments, step S4 of the method 1 comprising obtaining the second video stream VS2 comprising video images with object detection data ODD of the area may optionally further comprise receiving in step S41 the second video stream VS1 from a second vehicle 100, 32, 33, 34.

Hence, in some embodiments, the server as described above may obtain video streams from a second vehicle. In some embodiments, the first vehicle 100, 31 may be configured to obtain the second video VS2 stream from the second vehicle 100, 32, 33, 34. In some embodiments, the first vehicle may transfer the first; the first and the second; or only the second video stream to the server for update of the object detection system.

Likewise, in some embodiments, the second vehicle may obtain the first video stream VS1 from the first vehicle and may transfer the first video stream; the second video stream; or both the first and second video stream to the server. In some embodiments, the object detection system of the respective first and second vehicle may perform the object detection data update locally in each vehicle without involving an external server 200.

In some embodiments, the second vehicle may further store the second video stream VS2 comprising un-validated object detection data UODD. By storing the video stream comprising video images with un-validated object detection data UODD locally at the second vehicle (or at the vehicle that captured the video stream comprising video images with un-validated object detection data) data storage and storage space may be improved. The vehicles and/or server may focus on storing video streams that comprise un-validated object detection data in favor of storing validated object detection data. The stored streams may then be used for training the algorithm/object detection system at a later stage.

In some embodiments, the step of determining S3 the position of the object in the method 1 may optionally comprise the step S31 comprising determining a distance D1, D2, D3 and an angle $\alpha1, \alpha2, \alpha3$ to the object in relation to the first vehicle configured to obtain the first video stream VS1 comprising video images with object detection data ODD of the area. Hence, the method 1 may enable a vehicle to determine the location 23 of a detected object 22, which location 23 may then be used when gathering and analyzing other video streams of the area 21 in order to detect or not detect the object 22 in other video streams and thus train the object detection system to recognize un-validated object detection data UODD as validated object detection data VODD.

In some embodiments, the step S2 in method 1 of identifying (step S21) the object in the area may optionally further comprises the step S22 of identifying an object type of the object 22 to be one or more of a person, a vehicle, fixed object, moving object or an animal.

By identifying the object type, restrictions can be made in how much object detection data should be gathered and for how long. If the object type is determined to be a person, a vehicle, moving object or an animal then it may be of greater interest to collect video streams in a shorter period time than if the type of object is determined to be a fixed object. Furthermore, for fixed objects it may be of more interest to focus on gathering un-validated object detection data in order to train the object detection system to better recognize the object. For example, if the first vehicle determines that it has detected the fixed object, then its video stream comprising video images with the first object detection data may not have much value for training the system. If the second vehicle comes to the area where there is supposed to be a fixed object that should be detected, but fails to detect it in the second video stream even though the video stream is covering the area and the supposed position of the object, then that second video stream comprising video images with the un-validated object detection data may be of greater interest when training the system.

In some embodiments, the step S4 of the method 1 comprising obtaining the second video stream VS2 comprising video images with object detection data ODD of the area may optionally comprise the step S42 of identifying vehicles 100, 31, 32, 33, 34 recording respective video streams VS comprising video images with object detection data ODD of the area and requesting to receive the respective video streams VS. Recording, and in some embodiments requesting, may further be comprised in optional step S7 of the method 1. In some embodiments, the recording and requesting may comprise two different method steps, e.g. step S7 of recording and step S8 (not shown in FIG. 1) of requesting.

In some embodiments, the second video stream VS2 comprising video images with object detection data ODD of the area 21 comprises un-validated object detection data UODD at the position 23 of the object 22. As described above, the object detection data of the second video stream may e.g. comprise blurry video images, or partial video images which leads to that it cannot be confirmed whether the object detection data associated with the position of the object actually shows the object, and the object detection data hence comprise un-validated object detection data at the position of the object.

The method 1 has been described as being performed in a series of method steps in a validated order. It should be noted that the order of the steps may in some embodiments be another than that described above. For example, in some embodiments, the steps S4 and S5 may switch place with the steps of S1 and S2. The method 1 as described above defines a scenario where a first vehicle has detected an object and the object detection system of the first vehicle has validated it as validated object detection data. I.e. the object detection system of the first vehicle has validated that is has detected e.g. a person, vehicle, fixed object, animal etc. and may ask other vehicles in the area whether they see the same. If the other vehicles in the area determines that they do not, i.e. their object detection data associated with the position of the object and comprised in their respective videos stream is un-validated object detection data, then their video streams comprising video images with the un-validated object data may be used to update validated object detection data and hence train the system.

However, in some embodiments, a vehicle may obtain a video stream of an area, the video stream comprising video images with object detection data. The object detection system of the vehicle may react to that something is present in the object detection data, but it cannot be verified what it is. The video stream may e.g. be of inferior quality because of weather conditions (rain may e.g. result in blurred or inferior video images that are hard to interpret), or the video images are partly obstructed, or are blurry or for any other reasons do not provide object detection data that can be matched to validated object detection data. For example, when determining whether the video stream comprise video images with validated object detection data, the system may determine that a confidence value of the object detection data indicates a 42% probability that the data shows a person. The probability is not high enough to safely assume that the object is a person, but high enough to determine that there might be a person. Hence, validation is needed. The vehicle (or the object detection system comprised in the vehicle) may then inquire with other vehicles in the area if their video streams have captured validated object detection data associated with the location of the un-validated object detection data. The vehicle may receive the video streams from the other vehicles that comprise validated detection data, and may then update the object detection system based on the obtained/received un-validated and validated object detection data.

In some embodiments, the vehicle(s) may transmit their respective video streams to an external server in order to update the object detection system.

Figure 2:
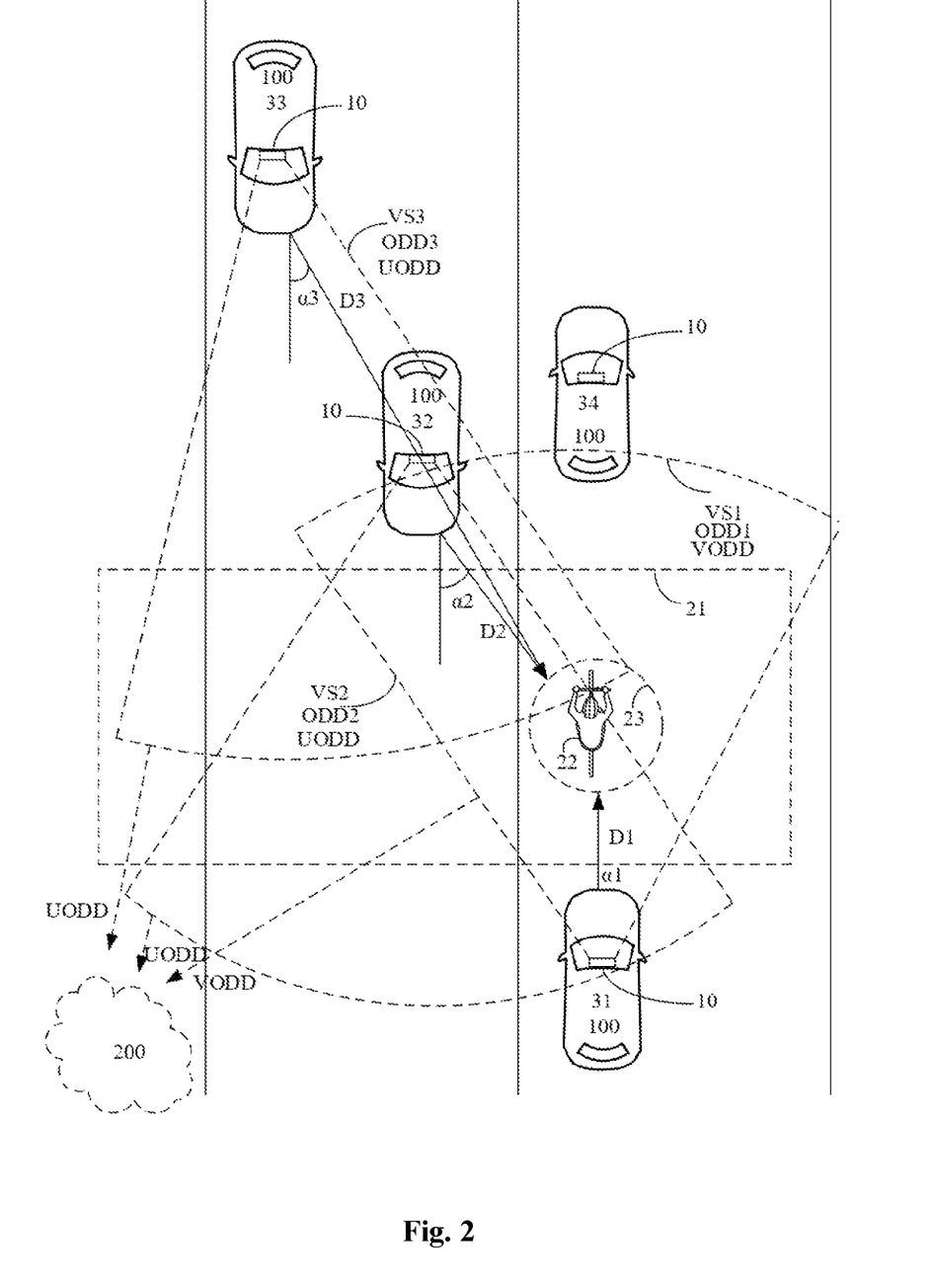
FIG. 2 shows schematically, an example detection scenario according to some embodiments.

FIG. 2 illustrates an example scenario where the method and embodiments described above may be applicable.

In FIG. 2, four motor vehicles 100 are present on a road. In particular a first vehicle 31, a second vehicle 32, a third vehicle 33 and a fourth vehicle 34. The first vehicle 31 may e.g. be the first vehicle as described in conjunction with FIG. 1. Likewise, the second 32, third 33 and fourth 34 vehicle may be the second vehicle as described in conjunction with FIG. 1. In FIG. 2 the vehicles 31, 32, 33 and 34 are illustrated as cars, this should be seen merely as an example as other types of vehicles are also possible, such as trucks, motor bikes, recreational vehicles, busses, etc.

The first 31, second 32, third 33 and 34 fourth vehicle are all equipped with a respective object detection system 10. The object detection system 10 of each respective vehicle provides obtaining a respective video stream VS1, VS2, VS3 and VS4 (VS4 is not shown in FIG. 2 for reasons that will be explained below), of an area 21. In the area 21, an object 22 is present at a position 23. The object 22 is illustrated as a bicyclist in FIG. 2, this is however just an example (for simplicity, all though a bicycle also is considered as a vehicle, the cyclist of FIG. 2 is not denoted as vehicle but as the object in this disclosure). The object 22 could also be any other type of object such as a pedestrian/person, vehicle, fixed object or animal, as described in conjunction with FIG. 1. The object 22 could furthermore be situated at another location than in the middle of road, such as on the pavement or similar.

In some embodiments, the object detection system 10 of the vehicles may be configured to transmit the recorded video streams VS1-VS4 to an external server 200 illustrated as a cloud in FIG. 2.

It should be noted that the video streams illustrated in FIG. 2 are exemplary, and may have other ranges. E.g., the video streams could cover a semicircle spanning 180 degrees from the object detection systems. The range and coverage of the video streams may be dictated by the type of unit that is recording the streams. Some cameras may e.g. record a full circle of 360, degrees, other may record a part of a circle of e.g. 270, 180, 90, 60 etc. degrees. It should also be noted that circular ranges are an example and other shape of ranges are contemplated. Furthermore, the length of the ranges may also vary according to the limitations of the recording camera/unit.

The object detection system 10 of the first vehicle 31 may thus obtain the first video stream VS1 comprising video images with object detection data of the area 21. The object detection system 10 of the first vehicle 31 may then identify the object 22 in the area 21 by identifying one or more first object detection data ODD1 in the first video stream VS1 corresponding to validated object detection data VODD.

For example, the one or more first object detection data ODD1 may e.g. clearly show the person on the bicycle (i.e. the cyclist) in the road. The object detection system 10 of the first vehicle 31 may comprise a database of validated object detection data, and when comparing the one or more first object detection data ODD1 to the validated object detection data there is a clear match and the object detection system of the first vehicle may then determine that it sees/has detected an object 22. In some embodiments, the validated object detection data of the object detection system may alternatively or additionally be an algorithm instructing the object detection system what to look for in object detection data in order to determine whether the object detection data is valid or not. The algorithm may e.g. comprise a series of patterns that should be fulfilled when analyzing the pixels of the video streams in order to determine valid or un-valid object detection data.

Then, the object detection system 10 of the first vehicle may determine the position 23 of the object 22 in the area 21. The first detection system may e.g. determine a distance D1 and an angle α1 to the object 22 in relation to the first vehicle 31. In some embodiments, the object detection system 10 may further tag the first video stream VS1 of the area 21 and the object 22 with a time stamp.

In some embodiments, the object detection system 10 may be configured to determining a time stamp of the first and second video streams, the time stamp indicating when the respective video stream was obtained.

In some embodiments, the object detection system 10 may be configured to determining a vehicle location and/or orientation of the vehicle recording the respective video stream. The video stream may be tagged (in addition or alternatively to the time stamp) with the vehicle location. The vehicle location may be a geographical location denoting the physical position of the vehicle and may be determined by means of e.g. GPS.

When the object detection system 10 of the first vehicle has determined that it sees an object, it may inquire other vehicles in the area, e.g. the second 32, third 33 and fourth 34 vehicles if they have a video stream over the area, and if they see the object 22. The object detection system of the first vehicle 31 may e.g. identify other vehicles recording video streams comprising video images with object detection data of the area. In some embodiments, the second 32 and third 33 vehicle may respond whereas the fourth vehicle 34 may not since it does not capture the area 21 (and its video stream VS4 is hence not shown in FIG. 2). Whether or not the fourth vehicle should respond may be dictated by the time stamp. If e.g. only real time video streams are of interest, the video stream of the fourth vehicle is not of interest since it does not capture the area 21 at the required time.

In some embodiments, the second 32 and third 33 vehicles may respond only if they determine the object detection data of each respective video stream VS2 and VS3 to comprise un-validated object detection data UODD associated with the position 23 of the alleged object 22 in the area 21. The second and third vehicles may try to identify the object 22 by e.g. also determine a distance D2, D3 and angle α2, α3 to the alleged object 22 in relation to the second and third vehicles respectively, and determine if the object detection data associated with the position is un-validated UODD or validated object detection data VODD. If the second and/or third object detection data ODD2, ODD3 of the second and/or third video streams VS2, VS3 is determined to be un-validated object detection data UODD, the second and/or third video streams comprising video images with un-validated object detection data UODD may be used for updating and thereby training the object detection system. In some embodiments, the object detection system 10 of the first vehicle may obtain all video streams of the area 21 (in FIG. 2, the VS2 and VS3) and identify whether the comprised second and third object detection data ODD2, ODD3 of VS2 and VS3 comprise the object 22 by trying to identify the object 22 at the position 23 in the area 21 in the video streams VS2 and VS3. The object detection system 10 of the first vehicle may further update validated object detection data with the object detection data obtained from the second and/or third video stream.

In some embodiments, the video streams VS1, VS2 and VS3 may be obtained by the external server 200 (e.g. a server in the cloud, as shown in FIG. 2) over a network connection such as the internet. The external server may perform the update of the validated object detection data if it is determined that obtained un-validated object detection data UODD possibly is correlated with validated object detection data VODD of the area, e.g. from the first video stream, (and thus train e.g. the algorithm of the object detection system that performs the detection) and then push the update to the object detection systems 10 of the first, second, third and fourth vehicles so that the respective object detection system 10 may be trained to recognize objects in various settings.

Above, it has been described that the object detection system is updated based on a first vehicle detecting validated object detection data (i.e. the first vehicle knows what object it is seeing) and other un-validated object detection data is then gathered from vehicles that cannot verify that they see the object in the same position. The gathered data is then used to update/train the system. E.g., a blurry video image, video image with inferior resolution or partial video image of the object (i.e. un-validated object detection data) may be correlated to the validated object detection data of the object. For example, the first vehicle may detect a pedestrian at a distance of 20 m. Detection is certain and is based on a video image of the pedestrian having a size of e.g. 200*50 pixels. The second vehicle may be further away and sees the same area but at a 250 m distance. The pedestrian may in such case be captured by 10*3 pixels which gives less good resolution than what the first vehicle could obtain and it may hence be more difficult for the second vehicle to know what it's seeing and the video stream of the second vehicle is hence valuable for training the system.

The video images may e.g. compared to each other and details matched to confirm that the un-validated object detection data from the second vehicle is in fact validated object detection data and determine e.g. a pattern in the un-validated object detection data that may be used in the future to determine whether object detection data is validated or un-validated. The next time a similarly blurry or incomplete video image of an object is captured in a video stream, the updated/trained object detection system may determine that the video image is validated object detection data based on the updated training algorithm of the object detection system.

It should be noted that the order of the vehicles are exemplary. The first vehicle may e.g. be the second, third or fourth vehicle and vice versa.

Furthermore, in some embodiments, the method may start with a vehicle determining that it cannot validate that what it is actually seeing in its video stream of an area is a validated object. E.g., the third vehicle 33 may detect un-validated object detection data UODD in its video stream VS3 at the position 23 of the area 21. The video stream VS3 may e.g. comprise a partially obstructed video image of the object 22. In FIG. 2, the line of sight to the object 22 from the third vehicle is e.g. partially obstructed by the second vehicle 32. If a correlation is performed, a confidence value of the object detection data of the video stream may e.g. be 40% which may not be high enough to pass a threshold for validated object detection data, but still be high enough such that the object detection system determines that there might be an object in the video stream that should be detected.

The third vehicle 33 may then after having determined that the third video stream VS3 comprise un-validated object detection data UODD associated with/at the position 23 of the area 21, identify other vehicles that have recorded a respective video stream covering the area 21. The third vehicle 33 may e.g. send out an enquiry to other present vehicles if they have detected validated object detection data associated with the position. In some embodiments, the second 32 and first 31 vehicle may respond by transmitting their respective video stream comprising video images with validated object detection data of the object 22 to the third vehicle 33. The third vehicle may then update the object detection system based on the determined un-validated object detection data and possibly the validated object detection data.

In some embodiments, the third vehicle 33 may locally update its object detection system 10, and possibly transmit the update to the other vehicles such that their respective object detection systems 10 are updated as well. In some embodiments, the third vehicle may transfer the obtained un-validated and possibly the validated object detection data to an external server comprising an object detection system and a database of validated object detection data and/or algorithms for recognizing validated object detection data. The external server may then use the obtained data to train/update the object detection system and possibly push the update to all object detection systems connected to the server and associated with a vehicle (e.g. the respective object detection system 10 associated with vehicles 31, 32, 33 and 34).

Figure 3:
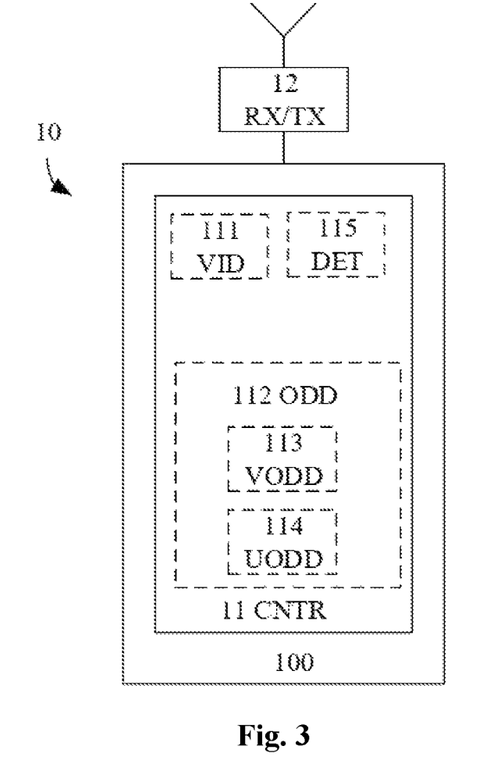
FIG. 3 shows block diagram of an example system according to some embodiments.

FIG. 3 illustrates in a block diagram an object detection system 10 for a vehicle 100 according to some embodiments. The object detection system 10 may e.g. be the object detection system as described in conjunction with any of the previous FIGS. 1-2. The vehicle 100 may e.g. be any of the vehicles as described in conjunction with FIGS. 1-2.

The object detection system 10 according to FIG. 3 comprises a control unit 11 (CNTR) and an object detection data module 112 (ODD) comprising validated object detection data 113 (VODD) and un-validated object detection data 114 (UODD) of one or more objects.

In some embodiments, the control unit 11 may comprise controlling circuitry. The control unit/controlling circuitry may comprise the object detection data module 112 for storing object detection data/algorithms of validated objection data 113 and un-validated object detection data 114. In some embodiments, the control unit may further comprise a video unit 111 (VID), and a determining unit 115 (DET). In some embodiments, the object detection system 10 may further comprise an antenna circuit 12 (RX/TX).

The control unit 11 is configured to perform obtaining of a first video stream (e.g. the VS1 of FIG. 2) comprising video images with object detection data of an area (compare with step S1 of the method 1). The control unit 11 may e.g. be configured to cause the video unit 111 to record and relay a first video stream VS1 and cause the object detection data module 112 to store the object detection data ODD of the first video stream VS1.

The control unit may further be configured to cause identifying of an object 22 in the area 21 by identifying one or more first object detection data ODD1 of the object 22 in the first video stream VS1 corresponding to validated object detection data VODD (compare with step S2 of the method 1). The control unit 11 may e.g. be configured to cause the ODD module 112 to determine whether the obtained object detection data corresponds to validated objection data or un-validated object detection data e.g. by using an algorithm for object detection and storing the object detection data as either validated object detection data 113 or un-validated object detection data 114.

The control unit 11 may be configured to cause determining of a position 23 in the area 21 of the object 22 (compare with step S3 in the method 1). The control unit 11 may e.g. be configured to cause the determining module 115 to determine the position 23.

The control unit 11 may be configured to cause obtaining of a second video stream VS2 comprising video images with object detection data of the area (compare to step S4 in method 1). The control unit 11 may e.g. be configured to cause the antenna circuit 12 to receive the second video stream VS2.

The control unit 11 may be configured to cause identifying of second object detection data ODD2 of the second video stream VS2 at the position 23 of the object 22, (compare with step S5 of method 1) and determine whether the second object detection data ODD2 is un-validated object detection data UODD. The control unit 11 may e.g. cause the object data detection module 112 to analyze the second object detection data ODD2 by means of stored algorithms for validated object detection data VODD, and/or match second object detection data ODD2 to stored validated object detection data VODD or to the validated object detection data VODD of the first video stream VS1. The control unit 11 may e.g. be configured to cause the object detection module 112 to determine whether the second object detection data ODD2 matches to validated detection data VODD stored in the module 112, 113. When no match is determined, the second object detection data ODD2 may be seen and identified as un-validated detection data UODD at the position 23 of the object 22.

In some embodiments, the control unit 11 may be configured to cause determining whether the second object detection data ODD2 is un-validated object detection data VODD by correlating the second object detection data ODD2 to validated object detection data VODD and based on the correlation determining a confidence value of the second object detection data, wherein if the confidence value is determined to be below a confidence threshold, the second object detection data is determined to be un-validated object detection data (compare with step S51 of method 1).

The control unit 11 may be configured to cause updating of the validated object detection data 113 of the object detection system 10 if it is determined that the second object detection data of the object 22 is un-validated object detection data UODD. The control unit 11 may e.g. cause the object detection module 112 to store the second objection detection data in the validated object detection database 113 as validated objection detection data and/or update a stored detection algorithm.

In some embodiments, the control unit 11 is configured to be connected to and receive video streams comprising video images with object detection data from at least a first and a second vehicle 100, 31, 32, 33, 34 (compare with method 1 and FIG. 2). The control unit 11 may e.g. be configured to cause the video module 111 to record a video stream, and/or cause the antenna circuit 12 to receive one or more video streams from at least a first and a second vehicle.

In some embodiments, the control unit 11 is further configured to store at the second vehicle 100, 32, 33, 34 the second video stream VS2 comprising un-validated object detection data UODD.

In some embodiments, the control unit 11 is further configured to determine a time stamp of the first and second video streams VS1, VS2, the time stamp indicating when the respective video stream was obtained.

In some embodiments, the control unit 11 is configured to identifying an object type of the object to be one or more of a person, a vehicle, fixed object or an animal (compare with step S22 of method 1). The control unit 11 may e.g. cause the ODD module 112, possibly in cooperation with the determining module 115 to determine and thereby identify (based on the object detection data) an object type of the object.

In some embodiments, the control unit 11 is configured to identifying vehicles recording video streams comprising video images with object detection data of the area (compare with steps S42 and S7 in method 1). The control unit 11 may for example be configured to cause antenna circuit 12 to search for and identify other vehicles in the area.

In some embodiments, the control unit 11 is configured to identifying vehicles recording video streams comprising video images with object detection data ODD of the area 21, the object detection data ODD comprising un-validated object detection data UODD at the position 23 of the object 22 (compare with steps S42 and S7 of method 1). The control unit 11 may e.g. be configured to cause the object detection module 112 to determine that the object detection data ODD is un-validated object detection data UODD.

In some embodiments, the object detection system 10 as described in FIG. 3 may be comprised in an external server 200. When comprised in an external server, the object detection system 10 may be configured to communicate with other object detection systems 10 comprised in vehicles 100, 31, 32, 33, 34 and (wirelessly) connected to the external server 200.

Figure 4:
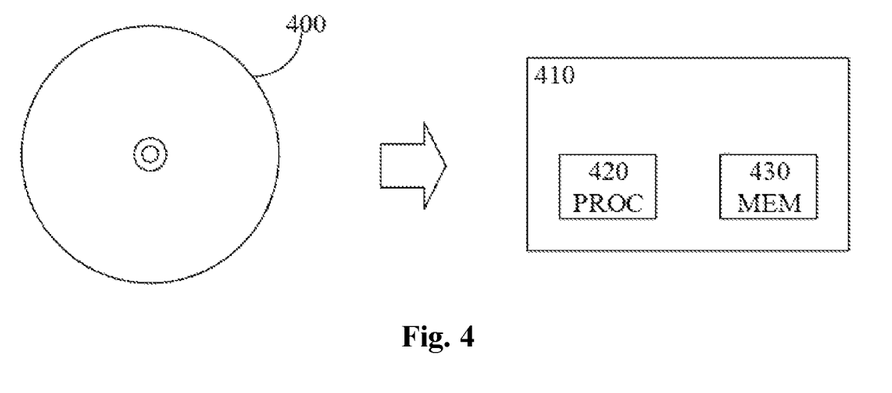
FIG. 4 shows a block diagram of an example computer program according to some embodiments.

FIG. 4 illustrates a computer program comprising instructions, which, when the program is executed by a computer, cause the computer to carry out the methods as described in conjunction with any of the previous FIGS. 1-3.

More particularly FIG. 4 illustrates in some embodiments a computer program product on a non-transitory computer readable medium 400. FIG. 4 illustrates an example non-transitory computer readable medium 400 in the form of a compact disc (CD) ROM 400. The non-transitory computer readable medium has stored thereon a computer program comprising program instructions. The computer program is loadable into a data processor (PROC; e.g., data processing circuitry or a data processing unit) 420, which may, for example, be comprised in a control unit 410. When loaded into the data processor, the computer program may be stored in a memory (MEM) 430 associated with or comprised in the data processor. According to some embodiments, the computer program may, when loaded into and run by the data processor, cause execution of method steps according to, for example, any of the methods illustrated in FIGS. 1-3, or otherwise described herein.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a system for object detection, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor(s) (associated with the object detection system) may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: method
100: Vehicle
31: 1st vehicle
32: 2nd vehicle
33: 3rd vehicle
34: 4th vehicle
10: Object Detection System
200: External server
VS1: First video stream
VS2: Second video stream
VS3: Third video stream
VS4: Fourth video stream
ODD1: First object detection data
ODD2: Second object detection data
ODD3: Third object detection data
VODD: Validated object detection data
UODD: Un-validated object detection data
D1-3: Distance to object from vehicle
α1-3: Angle to object relative vehicle
21: Area
22: Object
23: Position
11: Control unit, CNTR
12: Antenna circuit, RX/TX
111: Video unit, VID
112: Object detection data module, ODD
113: Validated object detection data, VODD
114: Un-validated object detection data, UODD
115: Determining module, DET
400: Computer program product
410: Data processing unit
420: Processor
430: Memory

What is claimed is:

1. A method for training an object detection system for a vehicle, wherein the object detection system comprises validated object detection data of one or more objects, the method comprising the steps of:
    obtaining a first video stream comprising video images with object detection data of an area,
    identifying an object in the area by identifying one or more first object detection data of the object in the first video stream corresponding to validated object detection data,
    determining a position of the object in the area,
    obtaining a second video stream comprising video images with object detection data of the area,
    identifying second object detection data of the second video stream at the position of the object and determining whether the second object detection data is un-validated object detection data,
    updating the validated object detection data of the object detection system if it is determined that the second object detection data of the object is un-validated object detection data, thereby training the object detection system to recognize patterns in un-validated object detection data.

2. The method according to claim 1, wherein the step of obtaining the first video stream comprising video images with object detection data of the area comprises receiving the first video stream from a first vehicle.

3. The method according to claim 1, wherein the step of obtaining the second video stream comprising video images with object detection data of the area comprises receiving the second video stream from a second vehicle.

4. The method according to claim 3, further comprising storing, at the second vehicle the second video stream comprising un-validated object detection data.

5. The method according to claim 1, further comprising determining a time stamp of the first and second video streams and a vehicle location, wherein the time stamp indicates when the respective video stream was obtained and wherein the vehicle location indicates a geographical location where the first and second video streams were obtained.

6. The method according to claim 1, wherein determining whether the second object detection data is un-validated object detection data comprises correlating the second object detection data to validated object detection data and based on the correlation determining a confidence value of the second object detection data, wherein if the confidence value is determined to be below a confidence threshold, the second object detection data is determined to be un-validated object detection data.

7. The method according to claim 1, wherein the step of determining the position of the object comprises determining a distance and an angle to the object in relation to the first vehicle configured to obtain the first video stream comprising video images with object detection data of the area.

8. The method according to claim 1, wherein the step of identifying the object in the area further comprises identifying an object type of the object to be one or more of a person, a vehicle, fixed object, moving object or an animal.

9. The method according to claim 1, wherein the step of obtaining the second video stream comprising video images with object detection data of the area comprises identifying vehicles recording respective video streams comprising video images with object detection data of the area and requesting to receive the respective video streams.

10. The method according to claim 9, wherein the second video stream comprising video images with object detection data of the area, comprises un-validated object detection data associated with the position of the object.

11. An object detection system for a vehicle, wherein the object detection system comprises a control unit and validated object detection data of one or more objects, the control unit is configured to perform the steps of:

obtaining a first video stream comprising video images with object detection data of an area, identifying an object in the area by identifying one or more first object detection data of the object in the first video stream corresponding to validated object detection data, determining a position of the object in the area, obtaining a second video stream comprising video images with object detection data of the area, identifying second object detection data of the second video stream at the position of the object and determining whether the second object detection data is un-validated object detection data, updating the validated object detection data of the object detection system if it is determined that the second object detection data of the object is un-validated object detection data, thereby training the object detection system to recognize patterns in un-validated object detection data.

12. The object detection system according to claim 11, wherein the control unit is configured to be connected to and receive video streams comprising video images with object detection data from at least a first and a second vehicle.

13. The object detection system according to claim 12, wherein the control unit is configured to store, at the second vehicle, the second video stream comprising un-validated object detection data.

14. The object detection system according to claim 11, wherein the control unit is further configured to determining a time stamp of the first and second video streams and a vehicle location, wherein the time stamp indicates when the respective video stream was obtained and wherein the vehicle location indicated a geographical location where the first and second video streams were obtained.

15. The object detection system according to claim 11, wherein the control unit is configured to determine whether the second object detection data is un-validated object detection data by correlating the second object detection data to validated object detection data and based on the correlation determining a confidence value of the second object detection data, wherein if the confidence value is determined to be below a confidence threshold, the second object detection data is determined to be un-validated object detection data.

16. The object detection system according to claim 11, wherein the control unit is configured to identifying an object type of the object to be one or more of a person, a vehicle, fixed object, moving object or an animal.

17. The object detection system according to claim 11, wherein the control unit is configured to identifying vehicles recording video streams comprising video images with object detection data of the area.

18. The object detection system according to claim 11, wherein the control unit is configured to identifying vehicles recording video streams comprising video images with object detection data of the area, the object detection data comprising un-validated object detection data at the position of the object.

19. A non-transitory computer readable medium storing a computer program comprising instructions which, when the program is executed by a computer, cause the computer to carry out the method of claim 1.

* * * * *